(12) United States Patent
Kim (10) Patent No.: US 11,977,023 B2
(45) Date of Patent: May 7, 2024

(54) ABSORBANCE SPECTROSCOPIC DEVICE

(71) Applicant: MICRO DIGITAL CO., LTD., Gyeonggi-do (KR)

(72) Inventor: Kyung Nam Kim, Gyeonggi-do (KR)

(73) Assignee: MICRO DIGITAL CO., LTD., Gyeonggi-Do (KR)

(*) Notice: Subject to any disclaimer, the term of this patent is extended or adjusted under 35 U.S.C. 154(b) by 0 days.

(21) Appl. No.: 17/765,138

(22) PCT Filed: Sep. 24, 2020

(86) PCT No.: PCT/KR2020/012959
§ 371 (c)(1),
(2) Date: Mar. 30, 2022

(87) PCT Pub. No.: WO2021/085865
PCT Pub. Date: May 6, 2021

(65) Prior Publication Data
US 2022/0373455 A1 Nov. 24, 2022

(30) Foreign Application Priority Data
Oct. 29, 2019 (KR) .......... 10-2019-0135116

(51) Int. Cl.
*G01N 21/31* (2006.01)
*G01J 3/42* (2006.01)
(Continued)

(52) U.S. Cl.
CPC .......... *G01N 21/31* (2013.01); *G01J 3/42* (2013.01); *G01N 21/255* (2013.01);
(Continued)

(58) Field of Classification Search
CPC .......... G01N 21/31; G01N 21/255; G01N 2021/035; G01N 2201/025; G01N 2201/06; G01N 21/49; G01J 3/42
(Continued)

(56) References Cited

U.S. PATENT DOCUMENTS

| | | | | |
|---|---|---|---|---|
| 7,688,448 B2* | 3/2010 | Bamberg | ............... | G01N 21/31 356/440 |
| 8,189,199 B2* | 5/2012 | Robertson, Jr. | ........ | G01N 21/01 356/440 |

(Continued)

FOREIGN PATENT DOCUMENTS

| | | |
|---|---|---|
| CN | 102232181 A | 11/2011 |
| JP | 2005-134167 A | 5/2005 |

(Continued)

OTHER PUBLICATIONS

State Intellectual Property Office of People's Republic of China, "The First Office Action" for counterpart Chinese patent application No. 202080054784.X, issued on Nov. 25, 2023.

*Primary Examiner* — Michelle M Iacoletti
*Assistant Examiner* — Noah J. Haney
(74) *Attorney, Agent, or Firm* — Bridgeway IP Law Group, PLLC; Sang Ho Lee; Hyun Woo Shin (57) ABSTRACT

Provided is a spectrophotometric device including a base plate including a first surface to accommodate a sample thereon, a rotatable plate including a second surface corresponding to and spaced a certain distance apart from the first surface, a test beam radiator connected to the first surface through a first beam guide to radiate a test beam to the sample accommodated on a beam path between the first and second surfaces, a spectrophotometer connected to the second surface through a second beam guide to analyze spectroscopic properties of the sample by analyzing a characteristic beam having passed through the sample accommodated on the beam path, and a state determiner provided near the beam path to determine whether the sample accommodated between the first and second surfaces is in a state in which analysis of optical properties is enabled.

7 Claims, 6 Drawing Sheets

(51) Int. Cl.
*G01N 21/25* (2006.01)
*G01N 21/03* (2006.01)

(52) U.S. Cl.
CPC . *G01N 2021/035* (2013.01); *G01N 2201/025* (2013.01); *G01N 2201/06* (2013.01)

(58) Field of Classification Search
USPC ......................................................... 356/319
See application file for complete search history.

(56) References Cited

U.S. PATENT DOCUMENTS

| | | | | |
|---|---|---|---|---|
| 9,683,931 | B2* | 6/2017 | Andersen | ............... G01N 33/49 |
| 10,921,239 | B2 | 2/2021 | Kono et al. | |
| 2003/0227622 | A1* | 12/2003 | Priestley | ................... G01J 4/00 |
| | | | | 356/365 |
| 2010/0085571 | A1 | 4/2010 | Robertson | |
| 2016/0025616 | A1* | 1/2016 | Chen | ...................... G01N 21/27 |
| | | | | 356/432 |
| 2017/0078634 | A1 | 3/2017 | Grenov | |
| 2017/0082533 | A1* | 3/2017 | Ashmead | ............... G01R 33/07 |
| 2020/0191705 | A1* | 6/2020 | Foster | .................. G01N 21/255 |

FOREIGN PATENT DOCUMENTS

| | | | |
|---|---|---|---|
| JP | 2019174338 A | 10/2019 | |
| KR | 101031647 B1 | 4/2011 | |
| KR | 101214556 B1 * | 12/2012 | ............. G01N 21/25 |
| KR | 101214556 B1 | 12/2012 | |
| KR | 101387576 B1 | 4/2014 | |
| KR | 20150101643 A | 9/2015 | |
| KR | 20160004731 A * | 1/2016 | ............. G01N 21/25 |
| WO | 2010055308 A1 | 5/2010 | |

* cited by examiner

FIG. 5B

ABSORBANCE SPECTROSCOPIC DEVICE

TECHNICAL FIELD

The present invention relates to a spectrophotometric device, and more particularly, to a spectrophotometer for measuring a microvolume sample, the spectrophotometer being capable of measuring components by using absorption properties of a bio sample.

BACKGROUND ART

In general, a spectrophotometer for measuring spectroscopic properties of representative materials of bio samples, i.e., nucleic acids, proteins, and cell cultures, is one of the most commonly used devices in biolaps.

Particularly, the spectrophotometer is based on measurement of a concentration of a bio sample by radiating a beam of various wavelengths to the sample and analyzing absorption of a beam of a specific wavelength by the bio sample by using a variety of applications including a full spectrum scan of the bio sample, standard curve determinations and ratio calculations, and enzyme and reaction kinetics over time.

That is, a basic optical technology which is the most commonly used to determine physical properties of the bio sample is absorption, and a device using absorption is a spectrometer or spectrophotometer.

Such a device is required to minimize loss of the sample or cross-contamination, and is particularly useful to analyze biotechnological samples including nucleic adds or proteins. The bio samples are very high-priced, e.g., millions of Korean wons per 1 ml, and the high prices of the bio samples actually place a great burden on many researchers who use the bio samples and significantly hinder the development of the bio industry.

DETAILED DESCRIPTION OF THE INVENTION

Technical Problem

According to the above-described general device, a small amount of a bio sample is diluted in various solutions to analyze spectroscopic properties of the bio sample, but an error may occur due to a time for and accuracy of diluting the bio sample and the diluted bio sample may not be recovered and reused once the bio sample is diluted.

The present invention provides a spectrophotometer for measuring properties of a microvolume sample, the spectrophotometer being capable of analyzing spectroscopic properties of a microvolume bio sample, and more particularly, of checking an accommodation state of the sample for stability and uniformity of the sample to measure the microvolume sample, of accurately providing a cause of failure in analyzing absorption, of easily and periodically check an operation state of an analysis device by efficiently providing a general quality control method of the analysis device, and of continuously checking the accommodation state of the sample to minimize an error in analysis result.

The present invention also provides a spectrophotometer for measuring properties of a microvolume sample, the spectrophotometer being capable of reducing production costs and greatly increasing productivity by using optical fibers to mechanically simplify an optical path and minimize optical components, and by using a micro-electro-mechanical system (MEMS) to produce components. However, the scope of the present invention is not limited thereto.

Technical Solution

According to an aspect of the present invention, there is provided a spectrophotometric device including a base plate including a first surface to accommodate a sample thereon, a rotatable plate including a second surface corresponding to and spaced a certain distance apart from the first surface, a test beam radiator connected to the first surface through a first beam guide to radiate a test beam to the sample accommodated on a beam path between the first and second surfaces, a spectrophotometer connected to the second surface through a second beam guide to analyze spectroscopic properties of the sample by analyzing a characteristic beam having passed through the sample accommodated on the beam path, and a state determiner provided near the beam path to determine whether the sample accommodated between the first and second surfaces is in a state in which analysis of optical properties is enabled.

The sample may be formed in a water column shape on the beam path due to surface tension of the first and second surfaces.

The first surface may be movable in a direction toward or away from the second surface.

The state determiner may include a beam transmitter for radiating a transmission beam to the beam path to determine a state of the sample between the first and second surfaces, and a beam receiver for receiving at least a portion of the transmission beam having passed though the beam path.

The beam transmitter and the beam receiver may face each other in a direction perpendicular to the beam path formed between the first and second surfaces, and be movable in a lengthwise direction of the beam path.

The spectrophotometric device may further include a controller for inputting control signals to the test beam radiator, the spectrophotometer, the beam transmitter, and the beam receiver, and generating analysis data, and a display for displaying the analysis data.

The controller may include a determiner for determining whether the sample is formed as a water column between the first and second surfaces, by determining a loss in amount of the transmission beam received by the beam receiver.

The controller may control the test beam radiator to radiate the test beam to proceed analysis, when the determiner determines that the sample is formed as an analyzable water column between the first and second surfaces, or control the display to display the state of the sample, when the determiner determines that the sample is not formed as an analyzable water column between the first and second surfaces.

The controller may include a radiation beam selector for selecting and controlling the test beam radiator to radiate the test beam, or selecting and controlling the beam transmitter to radiate the transmission beam.

Advantageous Effects

According to the afore-described embodiments of the present invention, spectroscopic properties of a microvolume bio sample may be analyzed, and more particularly, an accommodation state of the sample may be checked for stability and uniformity of the sample to measure the microvolume sample, and the accommodation state of the sample may be continuously checked to minimize an error in analysis result.

In particular, rapid and simple measurement may be enabled by an optical displacement sensor, an accommodation error of the sample may be detected without additional user interfacing, user convenience and analysis accuracy may be increased by re-accommodating the sample only when the error occurs, and cost reduction may be achieved because high-priced equipment requiring a high-resolution camera or the like is not used. However, the scope of the present invention is not limited to the above-described effects.

BEST MODE

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 1:
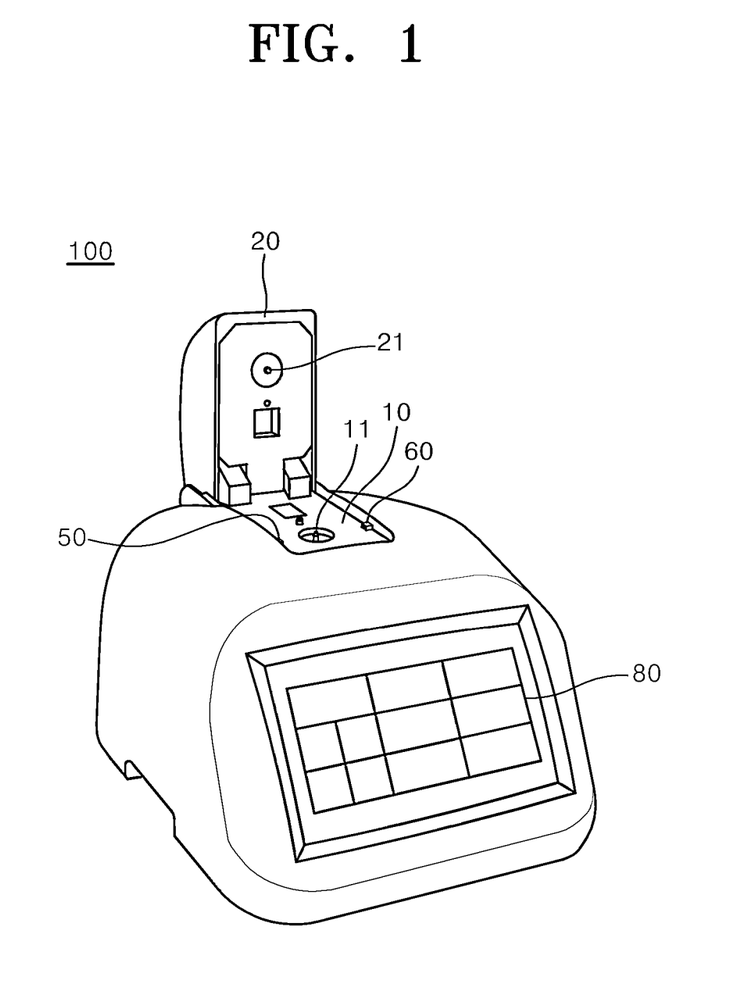
FIG. 1 is a perspective view of a microvolume spectrophotometric device according to an embodiment of the present invention.
Figure 2:
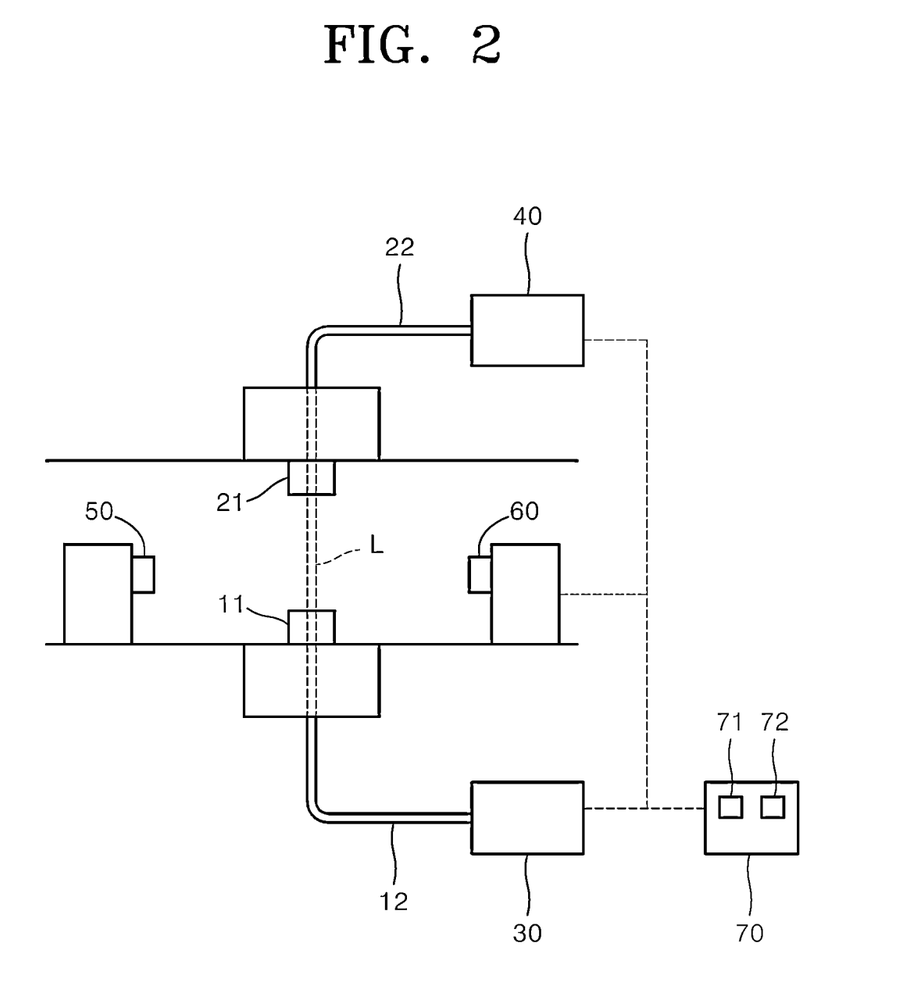
FIG. 2 is a structural view of a microvolume spectrophotometric device according to an embodiment of the present invention.

FIG. 1 is a perspective view of a microvolume spectrophotometric device 100 according to an embodiment of the present invention, and FIG. 2 is a structural view of the microvolume spectrophotometric device 100.

Initially, as illustrated in FIGS. 1 and 2, the spectrophotometric device 100 according to an embodiment of the present invention may mainly include a body, a base plate 10, a rotatable plate 20, a test beam radiator 30, a spectrophotometer 40, a state determiner, a controller 70, and a display 80.

As illustrated in FIG. 1, the body of the spectrophotometric device 100 of the present invention is a kind of case that surrounds and protects the exterior of the base plate 10, the rotatable plate 20, the test beam radiator 30, the spectrophotometer 40, the state determiner, the controller 70, and the display 80.

The base plate 10 may include a first surface 11 to accommodate a sample S thereon, and the rotatable plate 20 may include a second surface 21 corresponding to and spaced a certain distance apart from the first surface 11.

The base plate 10 may be provided in the body, and include, at a portion thereof, the first surface 11 capable of accommodating the sample S and include, at another portion thereof, a cuvette capable of accommodating another sample S.

The base plate 10 may be connected to the rotatable plate 20 by using a hinge in such a manner that the rotatable plate 20 may approach the base plate 10 with respect to an axis of the hinge provided at a side of the base plate 10.

In this case, the rotatable plate 20 may be provided in the body, and protect the first surface 11 and the sample S accommodated on the first surface 11 and block light from entering, by covering the base plate 10 when closed.

The rotatable plate 20 may be provided as a structure connected to the spectrophotometer 40 through a second beam guide 22, in such a manner that a first beam guide 12 connected from an external surface of the first surface 11 may be coaxial with the second beam guide 22 connected from an external surface of the second surface 21 and the first and second surfaces 11 and 21 may be parallel to each other when the rotatable plate 20 is closed and positioned above the base plate 10.

The base plate 10 and the rotatable plate 20 may be rotatable with respect to the axis of the hinge provided at the side, and the first and second surfaces 11 and 21 may form a certain interior angle therebetween.

Figure 3A:
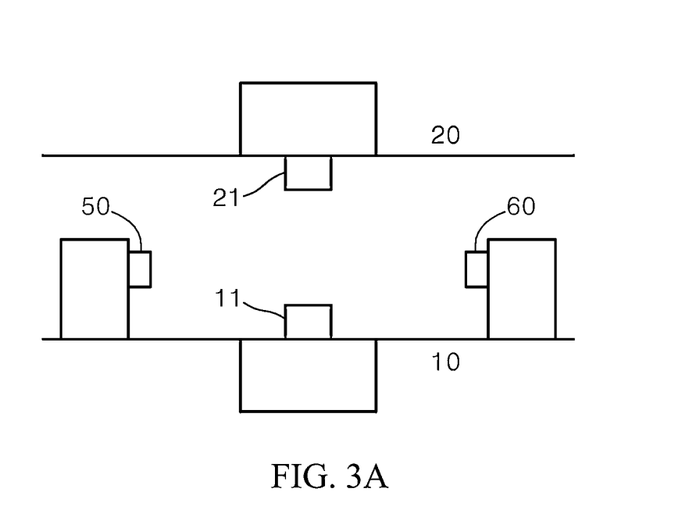
FIGS. 3A and 3B includes conceptual views showing motion of a first surface, a beam transmitter, and a beam receiver of a microvolume spectrophotometric device, according to an embodiment of the present invention.
Figure 3B:
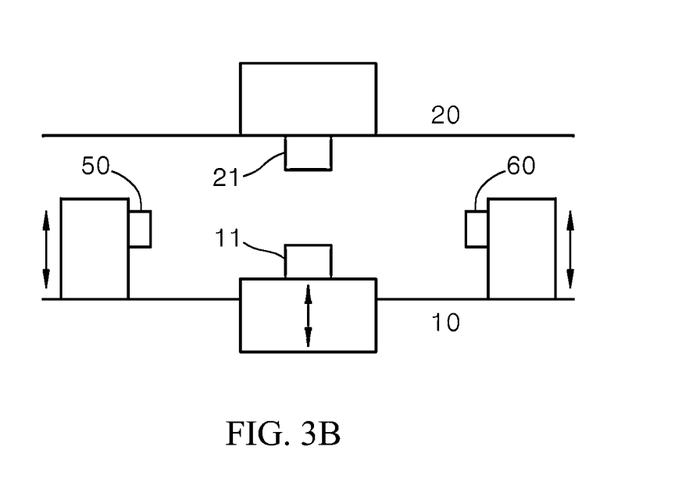

FIG. 3 includes conceptual views showing motion of the first surface 11, a beam transmitter 50, and a beam receiver 60 of the microvolume spectrophotometric device 100, according to an embodiment of the present invention.

As illustrated in FIG. 3, the first surface 11 may be movable in a direction toward or away from the second surface 21.

Specifically, a length of a beam path L between the first and second surfaces 11 and 21 may be adjusted by moving the first surface 11 in the direction toward the second surface 21, and thus an absorbance of the sample S may be measured by changing the beam path L formed by the sample S to measure the absorbance and by measuring the sample S at one or more path lengths. Herein, the absorbance of the sample S may be analyzed by combining a difference in length of the beam path L and a difference in transmission intensity.

The sample S may be formed in a water column shape on the beam path L due to surface tension of the first and second surfaces 11 and 21.

Specifically, the sample S may be placed on the first surface 11 by a user by using a pipette or the like, and the second surface 21 may be combined on the first surface 11. The first surface 11 may temporarily move in the direction toward the second surface 21 to soak the first and second surfaces 11 and 21 accommodating the sample S, and move in the opposite direction to pull the sample S and form a water column, thereby establishing the beam path L through which a beam is projected.

In this case, the sample S may be maintained by the surface tension between the first and second surfaces 11 and 21 which are substantially parallel to each other, and is provided in an extremely small amount less than or equal to $1\times10^{-5}$ L.

The test beam radiator 30 is a device connected to the first surface 11 through the first beam guide 12 to radiate a test beam to the beam path L formed between the first and second surfaces 11 and 21.

The test beam radiator 30 is a device for radiating a beam to the sample S accommodated on the beam path L, and may include at least one of a tungsten lamp, a deuterium arc lamp, a glow bar, a helium-neon laser, and a laser diode.

The test beam radiator 30 may further include a monochromator. The monochromator converts wide-wavelength light received from a light source, into a monochromatic radiation to use only a beam of a desired wavelength.

The spectrophotometer 40 is a device connected to the second surface 21 through the second beam guide 22 to analyze spectroscopic properties of the sample S by analyzing a characteristic beam transmitted through the sample S accommodated on the beam path L.

Specifically, when the test beam of a specific wavelength, which is generated from a light source of the test beam radiator 30, is guided through the first beam guide 12 in a direction toward the sample S and is changed into a characteristic beam having absorbed light of a specific wavelength while passing through the sample S, the spectrophotometer 40 may analyze the characteristic beam to measure the spectroscopic properties of the sample S, e.g., an absorbance, a transmittance, a concentration, or an absorbance spectrum.

In this case, various lenses, mirrors, reflectors, etc. may not be required because an optical path is simplified by connecting the first surface 11 to the test beam radiator 30 through the first beam guide 12 and connecting the second surface 21 to the spectrophotometer 40 through the second beam guide 22, thereby reducing production costs and greatly increasing productivity.

The state determiner may be provided near the beam path L to determine whether the sample S accommodated between the first and second surfaces 11 and 21 is in a state in which analysis of optical properties is enabled.

More specifically, the state determiner may include a beam transmitter 50 for radiating a transmission beam to the beam path L to determine a state of the sample S between the first and second surfaces 11 and 21, and a beam receiver 60 for receiving at least a portion of the transmission beam having passed though the beam path L.

For example, the beam transmitter 50 may be provided at a side of the first surface 11 on the base plate 10, and the beam receiver 60 may be provided at another side thereof. The beam transmitter 50 and the beam receiver 60 may face each other in such a manner that the beam receiver 60 may receive the transmission beam radiated from the beam transmitter 50, and the beam path L may be positioned between the beam transmitter 50 and the beam receiver 60.

As such, the transmission beam radiated from the beam transmitter 50 may pass through the beam path L and be received by the beam receiver 60. In this case, the transmission beam received by the beam receiver 60 may vary in amount depending on the state of the sample S formed on the beam path L.

Figure 4A:
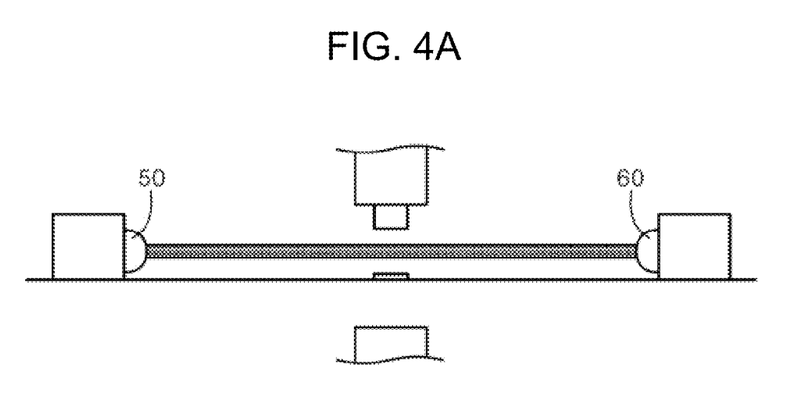
FIGS. 4A and 4B includes views comparatively showing transmission beams received by a beam receiver depending on presence of a sample, according to an embodiment of the present invention.
Figure 4B:
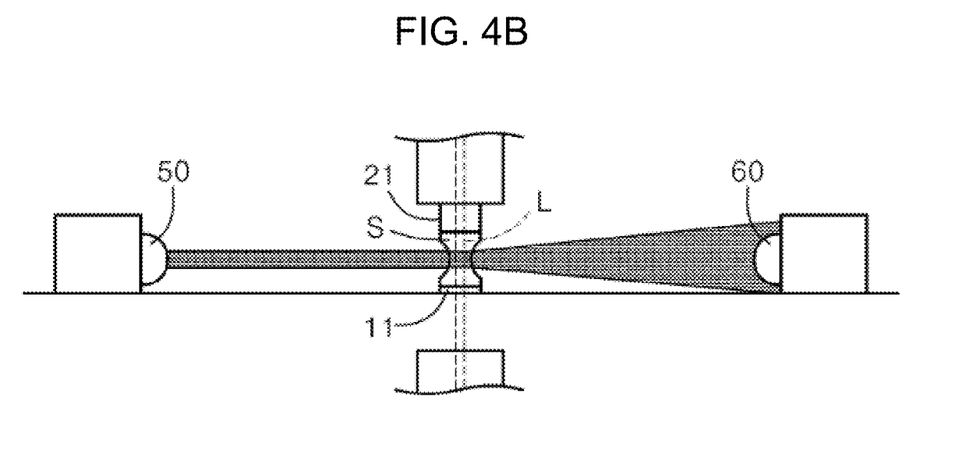
Figure 5A:
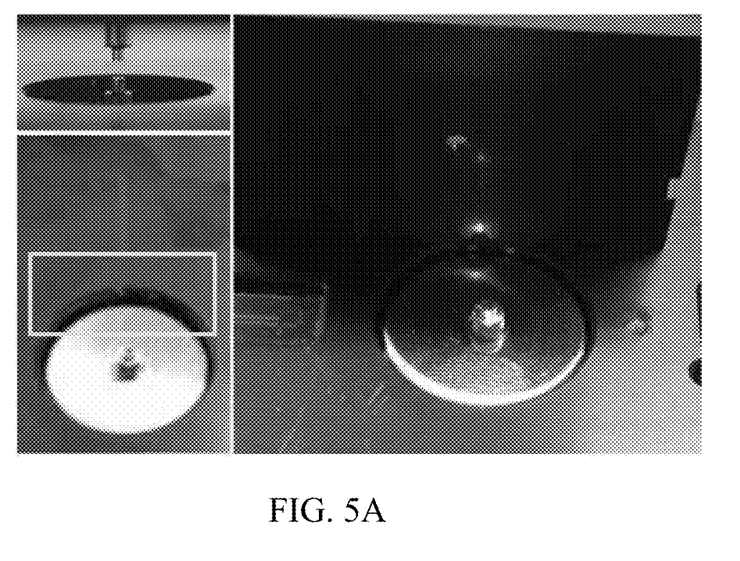
FIGS. 5A and 5B includes images comparatively showing transmission beams received by a beam receiver depending on a state of a sample, according to an embodiment of the present invention.
Figure 5B:
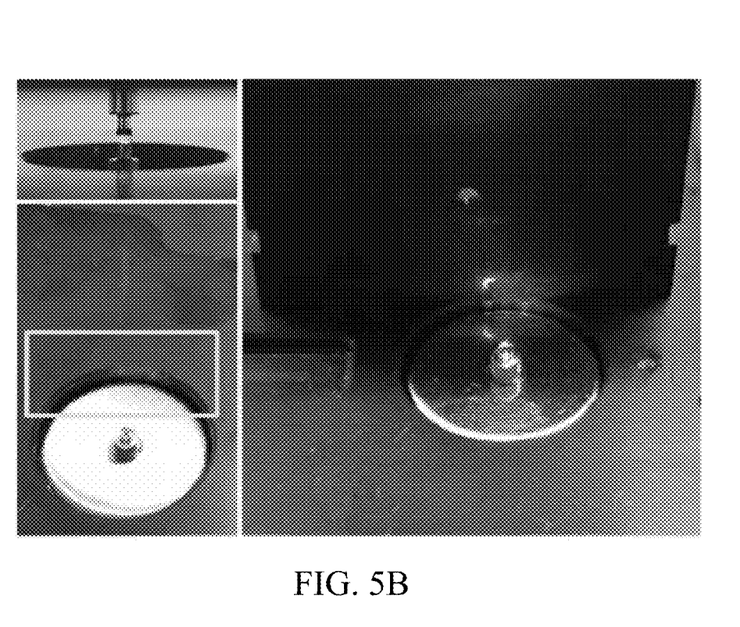

FIG. 4 includes views comparatively showing transmission beams received by the beam receiver 60 depending on presence of the sample S, according to an embodiment of the present invention, and FIG. 5 includes images comparatively showing transmission beams received by the beam receiver 60 depending on a state of the sample S, according to an embodiment of the present invention.

The controller 70 may input control signals to the test beam radiator 30, the spectrophotometer 40, the beam transmitter 50, and the beam receiver 60, and generate analysis data.

Specifically, the controller 70 may be separately connected to and separately control the test beam radiator 30, the spectrophotometer 40, the beam transmitter 50, and the beam receiver 60.

For example, the controller 70 may adjust a distance between the first and second surfaces 11 and 21 in such a manner that the sample S may form a water column due to surface tension of the first and second surfaces 11 and 21.

The controller 70 may control an amount and an intensity of a transmission beam radiated from the beam transmitter 50 toward the beam path L, and analyze the amount and the intensity of the transmission beam received by the beam receiver 60 provided at the opposite side of the beam path L.

The controller 70 may control presence and an intensity of a test beam radiated from the test beam radiator 30 to the sample S on the first surface 11 through the first beam guide 12, and analyze a characteristic beam having passed through the sample S and received by the spectrophotometer 40 through the second beam guide 22 connected to the second surface 21.

In this case, the controller 70 may include a determiner 71.

The determiner 71 may determine whether the sample S is formed as a water column between the first and second surfaces 11 and 21, by determining a loss in amount of the transmission beam received by the beam receiver 60.

The determiner 71 may analyze the amount and the intensity of the transmission beam radiated from the beam transmitter 50, having passed through the beam path L, and received by the beam receiver 60. As such, the determiner 71 may determine whether the sample S formed on the beam path L is accommodated in an analyzable state.

For example, when the sample S forms an analyzable water column between the first and second surfaces 11 and 21, as illustrated in (b) of FIG. 4, the transmission beam radiated from the beam transmitter 50 may be refracted through the sample S formed on the beam path L and a certain amount of the transmission beam may be received by the beam receiver 60. More specifically, as illustrated in (b) of FIG. 5, the transmission beam may pass through the sample S in a widespread shape and a certain amount of the transmission beam may be received by the beam receiver 60.

On the other hand, when the sample S is not accommodated between the first and second surfaces 11 and 21, as illustrated in (a) of FIG. 4, the sample S is not formed on the beam path L and most of the transmission beam radiated from the beam transmitter 50 is received by the beam receiver 60. More specifically, as illustrated in (a) of FIG. 5, the radiated transmission beam may be linearly received by the beam receiver 60 without being refracted.

Alternatively, when the sample S does not form an analyzable water column between the first and second surfaces 11 and 21, although not shown in the drawings, the transmission beam radiated from the beam transmitter 50 may pass through only a portion of the sample S formed on the beam path L, a large amount thereof may be refracted, and only a small amount of the transmission beam may be received by the beam receiver 60.

The determiner 71 may determine a case in which the sample S forms an analyzable water column between the first and second surfaces 11 and 21, a case in which the sample S is not accommodated between the first and second surfaces 11 and 21, or a case in which the sample S does not form an analyzable water column between the first and second surfaces 11 and 21, by analyzing the amount or the intensity of the transmission beam received by the beam receiver 60.

According to the spectrophotometric device 100 of the present invention, although a user does not check an accommodation state of the sample S every time to analyze spectroscopic properties of the sample S, the determiner 71 may detect an accommodation error of the sample S, and the sample S may be re-accommodated only when the error occurs, thereby increasing user convenience and analysis accuracy.

Specifically, the controller 70 may control the test beam radiator 30 to radiate the test beam to proceed analysis, when the determiner 71 determines that the sample S is formed as an analyzable water column between the first and second surfaces 11 and 21, or control the display 80 to display the state of the sample S, when the determiner 71 determines that the sample S is not formed as an analyzable water column between the first and second surfaces 11 and 21.

The controller 70 may further include a radiation beam selector 72.

The radiation beam selector 72 may select and control the test beam radiator 30 to radiate the test beam, or select and control the beam transmitter 50 to radiate the transmission beam.

The spectrophotometric device 100 of the present invention is a device capable of radiating two types of beams from the beam transmitter 50 and the test beam radiator 30, and may accommodate the sample S between the first and second surfaces 11 and 21, determine the state of the sample S by radiating the transmission beam from the beam transmitter 50, and then analyze the spectroscopic properties of the sample S by radiating the test beam from the test beam radiator 30.

When the transmission beam is radiated from the beam transmitter 50 to determine the state of the sample S, at least a portion of the transmission beam may be received by the beam receiver 60 to determine the state of the sample S, and reception of another type of beam by the beam receiver 60 needs to be avoided.

When the test beam is radiated from the test beam radiator 30 to analyze the spectroscopic properties of the sample S, the characteristic beam changed from the test beam while passing through the sample S may be received by the spectrophotometer 40 to analyze the spectroscopic properties of the sample S, and reception of another type of beam by the spectrophotometer 40 needs to be avoided.

Therefore, according to the spectrophotometric device 100 of the present invention, the accuracy of analysis by the beam receiver 60 and the spectrophotometer 40 may be increased by controlling the beam transmitter 50 and the test beam radiator 30 not to simultaneously radiate the two types of beams.

For example, when the sample S is accommodated between the first and second surfaces 11 and 21, the radiation beam selector 72 may select and control the beam transmitter 50 to radiate the transmission beam, and the test beam radiator 30 may not operate while the transmission beam is being radiated.

Then, when the determiner 71 determines that the sample S is formed as an analyzable water column between the first and second surfaces 11 and 21, the radiation beam selector 72 may select and control the test beam radiator 30 to radiate the test beam to the sample S formed on the beam path L, and the beam transmitter 50 may not operate while the test beam is being radiated.

On the other hand, when the determiner 71 determines that the sample S is not formed as an analyzable water column between the first and second surfaces 11 and 21, the controller 70 may control the radiation beam selector 72 not to select a radiation beam and control the display 80 to be described below, to display a notification for the user.

The display 80 is a device for displaying the analysis data, and may employ various display devices for displaying the analysis data on a screen, e.g., a cathode-ray tube (CRT), a liquid-crystal display (LCD), or a light-emitting diode (LED).

The display 80 may further include a command input device providable as various input devices connected to the controller 70 to input a user command signal to the controller 70, e.g., a touchpad, various switches, a joystick, or a mouse.

Therefore, after the user opens the rotatable plate 20 to manually accommodate the sample S on the first surface 11 by using a pipette or the like and then closes the rotatable plate 20 to make the sample S dark, the test beam may be radiated to the sample S through various channels by using the command input device and spectroscopic properties of the characteristic beam changed by the sample S may be analyzed.

That is, the spectrophotometric device 100 of the present invention includes the beam transmitter 50 and the beam receiver 60 to use a difference in amount of received light depending on whether a pedestal water column is formed.

In this case, because normal formation of a water column may be determined when the transmission beam is reduced in amount compared to an initial state when a water column formed by the sample S is not present, rapid and simple measurement may be enabled by the beam receiver 60 and automatic analysis may be enabled without additional user interfacing.

In addition, analysis accuracy may be increased by notifying in advance a failure in measuring absorption caused by abnormal accommodation of the sample S.

Furthermore, the spectrophotometric device 100 may also be used for the purpose of general quality control (QC) to periodically check an operation state thereof.

In a spectrophotometric device according to another embodiment of the present invention, as illustrated in FIG. 3, the beam transmitter 50 and the beam receiver 60 may face each other in a direction perpendicular to the beam path L formed between the first and second surfaces 11 and 21, and be movable in a lengthwise direction of the beam path L.

More specifically, to accommodate the sample S between the first and second surfaces 11 and 21 while maintaining surface tension, the first surface 11 accommodating the sample S may be movable in a direction toward or away from the second surface 21. In this case, a length of the beam path L and the sample S formed on the beam path L, and a circumference of a water column formed by the sample S may vary depending on the motion of the first surface 11.

To determine whether the sample S is accommodated in an analyzable state between the first and second surfaces 11 and 21, the beam transmitter 50 may be vertically adjusted in height based on the height of the sample S and radiate the transmission beam, and the beam receiver 60 adjusted in height equally to the beam transmitter 50 may receive the transmission beam.

As such, the beam transmitter 50 and the beam receiver 60 may move to be adjusted in height even when the length of the beam path L between the first and second surfaces 11 and 21 differs depending on the sample S, and it may be accurately determined whether the sample S is accommodated in an analyzable state between the first and second surfaces 11 and 21.

While the present invention has been particularly shown and described with reference to embodiments thereof, it will be understood by one of ordinary skill in the art that various changes in form and details may be made therein without departing from the scope of the present invention as defined by the following claims.

INDUSTRIAL APPLICABILITY

According to some embodiments of the present invention, spectroscopic properties of a microvolume bio sample may be analyzed, rapid and simple measurement may be enabled by an optical displacement sensor, an accommodation error of the sample may be detected without additional user interfacing, user convenience and analysis accuracy may be increased by re-accommodating the sample only when the error occurs, and cost reduction may be achieved because high-priced equipment requiring a high-resolution camera or the like is not used.

The invention claimed is:

1. A spectrophotometric device comprising:
a base plate comprising a first surface to accommodate a sample thereon;
a rotatable plate comprising a second surface corresponding to and spaced a certain distance apart from the first surface;
a test beam radiator connected to the first surface through a first beam guide to radiate a test beam to the sample accommodated on a beam path between the first and second surfaces;
a spectrophotometer connected to the second surface through a second beam guide to analyze spectroscopic properties of the sample by analyzing a characteristic beam having passed through the sample accommodated on the beam path; and
a state determiner provided near the beam path to determine whether the sample accommodated between the first and second surfaces is in a state in which analysis of optical properties is enabled;
wherein the test beam is radiated in a direction parallel to the beam path,
wherein the state determiner comprises:
a beam transmitter for radiating a transmission beam to the beam path to determine a state of the sample between the first and second surfaces; and
a beam receiver for receiving at least a portion of the transmission beam having passed through the beam path,
wherein the beam transmitter and the beam receiver face each other in a direction perpendicular to the beam path formed between the first and second surfaces or to the test beam, and are movable in a lengthwise direction of the beam path during the determining of the state of the sample.

2. The spectrophotometric device of claim 1, wherein the sample is formed in a water column shape on the beam path due to surface tension of the first and second surfaces.

3. The spectrophotometric device of claim 1, wherein the first surface is movable in a direction toward or away from the second surface.

4. The spectrophotometric device of claim 1, further comprising:
a controller for inputting control signals to the test beam radiator, the spectrophotometer, the beam transmitter, and the beam receiver, and generating analysis data; and
a display for displaying the analysis data.

5. The spectrophotometric device of claim 4, wherein the controller comprises a determiner for determining whether the sample is formed as a water column between the first and second surfaces, by determining a loss in amount of the transmission beam received by the beam receiver.

6. The spectrophotometric device of claim 5, wherein the controller controls the test beam radiator to radiate the test beam to proceed analysis, when the determiner determines that the sample is formed as an analyzable water column between the first and second surfaces, or controls the display to display the state of the sample, when the determiner determines that the sample is not formed as an analyzable water column between the first and second surfaces.

7. The spectrophotometric device of claim 4, wherein the controller comprises a radiation beam selector for selecting and controlling the test beam radiator to radiate the test beam, or selecting and controlling the beam transmitter to radiate the transmission beam.

* * * * *